US007551137B2

(12) United States Patent
Gagnon

(10) Patent No.: US 7,551,137 B2
(45) Date of Patent: Jun. 23, 2009

(54) APPARATUS AND METHOD FOR TRACING A PATH TRAVELLED BY AN ENTITY OR OBJECT, AND TAG FOR USE THEREWITH

(75) Inventor: André Gagnon, Gatineau (CA)

(73) Assignee: Tektrap Systems Inc., Gatineau, QC (CA)

( * ) Notice: Subject to any disclaimer, the term of this patent is extended or adjusted under 35 U.S.C. 154(b) by 0 days.

(21) Appl. No.: 11/149,233

(22) Filed: Jun. 10, 2005

(65) Prior Publication Data
US 2005/0285790 A1    Dec. 29, 2005

Related U.S. Application Data

(60) Provisional application No. 60/578,433, filed on Jun. 10, 2004.

(51) Int. Cl.
*G01S 3/02* (2006.01)
*H01Q 3/00* (2006.01)
(52) U.S. Cl. ...................... 342/464; 342/377
(58) Field of Classification Search ............. 342/116, 342/451, 64, 191, 357.13, 463, 464, 457, 342/387, 450, 453, 357, 552, 539, 551, 553, 342/554, 561–567, 377; 340/572.1, 572.4, 340/506, 511, 526, 539, 541, 521, 517, 825.73; 375/130–153
See application file for complete search history.

(56) References Cited

U.S. PATENT DOCUMENTS

| 3,319,169 | A | * | 5/1967 | Axe ........................... 455/218 |
| 4,060,718 | A | * | 11/1977 | Huddle ......................... 702/2 |
| 4,258,421 | A | * | 3/1981 | Juhasz et al. .................. 701/35 |
| 4,596,988 | A | * | 6/1986 | Wanka ....................... 342/457 |
| 4,651,156 | A | * | 3/1987 | Martinez .................... 342/457 |
| 4,799,062 | A | * | 1/1989 | Sanderford et al. .......... 342/450 |
| 4,918,425 | A | * | 4/1990 | Greenberg et al. ........ 340/539.3 |
| 5,014,040 | A | | 5/1991 | Weaver et al. |
| 5,014,206 | A | | 5/1991 | Scribner et al. |
| 5,040,240 | A | | 8/1991 | Keegan |
| 5,223,844 | A | | 6/1993 | Mansell et al. |
| 5,510,766 | A | * | 4/1996 | Harman et al. ............. 340/552 |
| 5,548,828 | A | * | 8/1996 | Kozaki et al. ............. 455/161.2 |
| 5,648,763 | A | | 7/1997 | Long |
| 5,654,719 | A | * | 8/1997 | Kunii ........................ 342/451 |
| 5,678,182 | A | * | 10/1997 | Miller et al. ............... 455/12.1 |
| 5,760,713 | A | * | 6/1998 | Yokoyama et al. ...... 340/995.19 |
| 5,774,876 | A | * | 6/1998 | Woolley et al. ............... 705/28 |
| 5,845,227 | A | * | 12/1998 | Peterson ..................... 701/209 |

(Continued)

*Primary Examiner*—Thomas H Tarcza
*Assistant Examiner*—Harry Liu
(74) *Attorney, Agent, or Firm*—Marks & Clerk; Richard J. Mitchell

(57) ABSTRACT

Apparatus and method for tracing a geographical journey taken by an entity, for example an article (shipment), asset or person, on a worldwide map uses a miniature, passive, low power, radio receiver tag that is attached to the entity and collects multiple FM spectra during the travels of the entity. When the tag is retrieved at the end of the journey, the FM spectra are downloaded and compared against a collection of constructed spectra constructed from antenna transmission and location data derived. Correlating each of the spectra collected by the receiver tag with the corresponding spectra in the database allows the regions traversed by the receiver tag, and hence the entity, during its travels to be plotted.

27 Claims, 8 Drawing Sheets

U.S. PATENT DOCUMENTS

| | | |
|---|---|---|
| 5,850,187 A * | 12/1998 | Carrender et al. .......... 340/10.6 |
| 5,895,436 A | 4/1999 | Savoie et al. |
| 5,939,982 A * | 8/1999 | Gagnon et al. ......... 340/539.17 |
| 6,211,781 B1 | 4/2001 | McDonald |
| 6,252,507 B1 * | 6/2001 | Gagnon ..................... 340/552 |
| 6,288,640 B1 * | 9/2001 | Gagnon ................ 340/539.17 |
| 6,480,108 B2 | 11/2002 | McDonald |
| 6,577,241 B2 | 6/2003 | Neidig et al. |
| 6,606,556 B2 | 8/2003 | Curatolo et al. |
| 6,745,027 B2 * | 6/2004 | Twitchell, Jr. ............ 455/422.1 |
| 6,774,797 B2 | 8/2004 | Freathy et al. |
| 6,812,824 B1 * | 11/2004 | Goldinger et al. .......... 340/10.1 |
| 6,889,135 B2 | 5/2005 | Curatolo et al. |
| 6,891,469 B2 | 5/2005 | Engellenner |
| 6,892,131 B2 * | 5/2005 | Coffee et al. ................ 701/200 |
| 7,079,043 B2 * | 7/2006 | O'Toole et al. ........ 340/825.36 |
| 7,138,914 B2 * | 11/2006 | Culpepper et al. ..... 340/539.13 |
| 2002/0125948 A1 * | 9/2002 | Haigh et al. ................ 330/151 |
| 2003/0007473 A1 * | 1/2003 | Strong et al. ................ 370/338 |
| 2004/0054471 A1 * | 3/2004 | Bartlett et al. .............. 701/213 |
| 2004/0156427 A1 * | 8/2004 | Gilhousen et al. .......... 375/150 |
| 2004/0189471 A1 * | 9/2004 | Ciarcia et al. ............. 340/572.1 |
| 2004/0198389 A1 * | 10/2004 | Alcock et al. ............ 455/456.1 |
| 2005/0129139 A1 * | 6/2005 | Jones et al. ................. 375/295 |
| 2005/0243936 A1 * | 11/2005 | Agrawala et al. ........... 375/259 |

* cited by examiner

APPARATUS AND METHOD FOR TRACING A PATH TRAVELLED BY AN ENTITY OR OBJECT, AND TAG FOR USE THEREWITH

CROSS REFERENCE TO RELATED APPLICATION

This application claims priority from U.S. Provisional patent application Ser. No. 60/578,433 filed Jun. 10, 2004, the contents of which are incorporated herein by reference.

BACKGROUND OF THE INVENTION

1. Technical Field

The invention relates to a method and apparatus for tracing a path traversed by an entity or object, for example an article, e.g. a container shipment, asset or person, such as a person under surveillance, potentially worldwide. The invention also relates to a tag for use with the method and a method of providing a historical database of frequency spectra extant at different geographical locations.

2. Background Art

The popularity and availability of the Global Positioning System (GPS) and low cost radio frequency identification (RFID) systems have led to significant increases in the use of systems for tracking articles or people. Thus, GPS is becoming a commodity product for the transport industry and RF (Radio Frequency) tags are also becoming widely used for indoor tracking of articles and for access control.

A key feature of these tracking systems is their ability to provide for accurate real-time location of the article under observation. To do so, however, they employ devices which must either be active (transmit RF signals) or rely upon other RF transmitters (e.g. GPS or WAN system) with known positions.

For example, U.S. Pat. No. 5,014,040 and, more recently, U.S. Pat. Nos. 6,891,469 and 6,889,135, disclose tracking systems in which an active radio transmitter associated with the article or person being tracked is used to set up a known radiation field, and multiple tuned receivers are used to detect the presence of the radio transmitter, the location of the transmitter being determined using triangulation. Disadvantages of such active RF systems include short operating times for transmitters or transceivers that, as a general rule, will be battery operated, and the fact that the transmissions may be detected easily, making them unsuitable for covert operation.

Some known systems utilize existing navigational systems, such as LORAN and Global Positioning Systems (GPS) to determine the exact location of the vehicle, in terms of geographic coordinates (longitude and latitude), either during its travel or at the locations of specific operations such as loading or unloading. Examples are disclosed in U.S. Pat. No. 5,040,240 (Keegan) and U.S. Pat. No. 5,014,206 (Scribner et al.).

U.S. Pat. Nos. 6,606,556 and 5,223,844 disclose security systems based upon GPS technology, the former for tracking a person, and the latter for tracking a stolen vehicle. A major disadvantage of such GPS-based tracking systems is that they require a line-of-sight between the GPS antenna and the satellite(s). In addition, the receiver circuitry is too large to meet most size requirements of covert systems and power consumption may limit battery life.

U.S. Pat. No. 6,774,797 discloses a system for tracking movements of an individual by means of a tracking tag which uses GPS and/or cellular telephone geolocation methods to determine its location and transmits the location information to a monitoring center.

U.S. Pat. No. 5,648,763 discloses a security system for controlling access to cargo containers which has a receiver for receiving LORAN-C or GPS signals and using them to produce a position signal corresponding to the current geographic position of the container. This position signal is compared with a preset signal representing a predetermined geographic position and, when the two correspond, an enabling signal permits the security system to gain access to the container. Again, the use of GPS introduces line-of-sight limitations, LORAN-C is limited to maritime applications, and only the one location of the container is of interest or consequence.

There is also a growing need for tracing systems which differ from tracking systems because, at least in the context of this specification, a tracking system is defined as a system that allows determination of the current geographical location of the article being tracked, whereas a tracing system is defined as a system that allows determination of a geographical path traversed by the article after it has completed its travels.

Some known systems, specifically systems using active RF techniques, provide tracking and/or tracing capabilities but, as compared with passive RF techniques, have limitations in that they do not provide, for example, (i) very low DC power consumption, meaning longer operational life; (ii) simple electronic circuitry, leading to miniature dimensions and very low cost; and (iii) inaccessible real-time data, meaning better compliance with human rights legislation.

U.S. Pat. No. 6,480,108 discloses a system for tracing the path taken by a tag through several defined geographic areas. The tag includes a transmitter and a receiver. Tag readers in the different geographic areas transmit RF signals and, in response, the tag transmits RF signals to the tag-readers. Knowing the areas in which the tag readers are located, the system can trace the path taken by the tag. This is an active system and so suffers from at least some of the disadvantages of active tracking systems, as described above.

It is also known to use signals from cellular telephone base stations to track vehicles. For example, U.S. Pat. No. 5,895,436 discloses a system for tracking a vehicle using cellular telephone signals which are detected by a cellular transceiver installed in the vehicle. Such cellular telephone tracking systems suffer from lack of ground coverage and dead spots, especially when the vehicle is indoors. Moreover, like GPS receives, cellular telephone receivers consume substantially more DC power in comparison to FM receivers, especially if the FM receiver is used without any audio output.

It is also known to use electronic identification tags to track the movement of livestock For example, U.S. Pat. No. 6,577,241 discloses a system in which a manufacturer creates a plurality of identification tags each having a unique identification number that is associated with a corresponding "prerecord" in a central database. Each customer purchasing a tag is given access to the database to enter or read data in the corresponding prerecord. Although the system allows the movement of the animal to be traced, the tag is not neither a radio transmitter nor a radio receiver. The system requires data to be entered and updated by the customer.

U.S. Pat. No. 5,939,982 discloses a system for detecting opening of a shipping container which houses, along with the goods-in-transit, at least the antenna of an FM receiver that monitors FM broadcast signals. If the receiver detects an increase in the received signal strength, evidencing at least partial or opening of the container, it produces an alarm signal. The receiver may also scan and store the FM spectrum pertaining at the time the container was open. Comparison of the stored FM spectrum with charts of FM spectra for various cities allows an investigator to identify the approximate location of the container when the intrusion occurred. While this arrangement maybe acceptable in the context of intrusion detection, the receiver only scans and stores location information if the container is opened, and the system does not provide for tracing a path taken by the container. Also, the comparison is not automatic.

SUMMARY OF THE INVENTION

The present invention seeks to eliminate, or at least mitigate, the disadvantages of the prior art and has for its object to provide a system for tracing a geographical path previously taken by an entity or object, such as a person or a shipping container. To this end, there is provided a tracing system for providing a trace of a geographical path of travel previously taken by an entity or object, the system comprising a tag device and data retrieval means;

the tag device being associated, in use, with the entity or object and having a radio receiver operable to scan a predetermined radio band at preset times as the entity or object traverses said path of travel, and capture the extant frequency spectrum, storage means for storing said captured frequency spectrum, and output means for outputting a resulting plurality of captured frequency spectra;

the retrieval means comprising computer means for communicating with said output means of the tag device, retrieving a plurality of captured frequency spectra from said storage means, correlating said captured frequency spectra with known antenna transmissions and geographical location data to determine the location of the tag device when each captured frequency spectrum was captured, deriving the path of travel from the successive geographical locations, and providing a trace of said path of travel.

The computer means may be operable following retrieval of the captured frequency spectra to (i) receive user-supplied information identifying at least approximately a first search area traversed by the tag device, to retrieve antenna transmission and geographical location data to construct a first frequency spectrum comprising a set of signal frequencies of signals receivable in said search area at the time the tag was in said first search area;

(ii) correlate the first constructed frequency spectrum with each captured frequency spectrum in turn to determine the captured frequency spectrum having the highest correlation therewith and store geographical coordinates of the first search area as the geographical location of the tag device when said highest-correlation frequency spectrum was captured;

(iii) define a second search area encompassing an area around or neighboring the first search area;

(iv) construct a second constructed frequency spectrum for the second search area comprising a set of signal frequencies of signals receivable in said second search area at the time the tag device was in said second search area;

(v) correlate the second constructed frequency spectrum with at least those captured frequency spectra captured at times close to the time of capture of the first captured frequency spectrum to determine a second captured frequency spectrum having the highest correlation therewith;

(vi) store geographical coordinates of the second search area as the geographical location of the tag device when said second highest-correlation frequency spectrum was captured;

and repeat the process for other captured frequency spectra to obtain geographical coordinates of successive regions traversed by the tag device.

Additionally or alternatively, the receiver may demodulate, from each transmission, signal information (e.g. RDS) identifying the source, and store said information in the corresponding record for that preset time, the identification information being used, when the tag has traversed the path, to determine the locations of the receiver at the preset times and hence the path traversed by the tag and entity or object with which it travelled.

Preferably, the computer means is operable, prior to correlating a particular captured spectrum with a constructed spectrum, to compare signal strengths of signals in said captured spectrum with a predetermined threshold signal strength level and select only those signals whose strengths exceed the threshold for correlation with the constructed spectrum.

The computer means may be operable to derive from the location coordinates of the series of regions a map of regions with the path depicted as an overlay thereupon.

The database preferably comprises historical collections of said reference spectra allowing comparisons with reference spectra that were valid or pertaining at the times and locations at which the tag scanned and stored the frequency spectra.

According to a second aspect of the invention, there is provided a method of providing a trace of a geographical path previously taken by an entity or object having associated therewith a tag device having a radio receiver for capturing frequency spectra, storage means for storing captured spectra and output means for outputting a resulting plurality of captured frequency spectra, the method comprising the steps of:

using the radio receiver to scan a predetermined radio frequency band at each of a plurality or preset times as the entity or object traverses the path, and capture the frequency spectrum extant at each time, and storing each said captured frequency spectrum in said storage means; and when the tag device and entity/object have traversed the path, retrieving a plurality of captured frequency spectra from the tag device and correlating said captured frequency spectra with known antenna transmissions and geographical location data to determine the geographical location of the tag device when each captured frequency spectrum was captured, deriving the travel path from the successive geographical locations, and providing a trace of said travel path.

The step of retrieving and correlating the captured frequency spectra may comprise the steps of (i) using user-supplied information identifying at least approximately a first search area traversed by the tag device, retrieving antenna transmission and geographical location data to construct a first frequency spectrum comprising a set of signal frequencies of signals receivable in said search area at the time the tag device was in said first search area;

(ii) correlating the first constructed frequency spectrum with each captured frequency spectrum in turn to determine the captured frequency spectrum having the highest correlation therewith and storing geographical coordinates of the first search area as the geographical location of the tag device when said highest-correlation frequency spectrum was captured;

(iii) defining a second search area encompassing an area around or neighboring the first search area;

(iv) constructing a second constructed frequency spectrum for the second search area comprising a set of signal frequencies of signals receivable in said second search area at the time the tag device was in said second search area;

(v) correlating the second constructed frequency spectrum with at least those captured frequency spectra captured at times close to the time of capture of the first captured frequency spectrum to determine a second captured frequency spectrum having the highest correlation therewith;

(vi) storing geographical coordinates of the second search area as the geographical location of the tag device when said second highest-correlation frequency spectrum was captured;

and repeating steps (iii) to (vi) for other captured frequency spectra to obtain geographical coordinates of successive regions traversed by the tag device.

The correlation step may comprise the step of, prior to correlating a particular captured spectrum with a constructed spectrum, comparing signal strengths of signals in said captured spectrum with a predetermined threshold signal strength level and select only those signals whose strengths exceed the predetermined threshold signal strength level for correlation with the constructed spectrum.

According to a third aspect of the invention, there is provided a radio receiver tag suitable for use in tracing a path taken by an entity or object with while accompanied by the radio receiver tag, comprising:

a radio receiver operable to scan a predetermined radio frequency band and capture data representing a frequency spectrum thereof;

storage means for storing a plurality of data records each corresponding to a respective one of a plurality of the frequency spectra;

control means for controlling the radio receiver to scan the radio frequency band at preset times, while the entity or object is traversing said path, and store the resulting frequency spectra data in said storage means; and output means for outputting said frequency spectra data.

Preferably, the antenna transmission and location information are available via a public data network, such as the Internet, perhaps on a subscription basis.

The predetermined radio frequency band may be selected according to the path being/to be traversed. For example, the receiver may scan the broadcast FM radio band(s) used in the countries through which the tag will travel. The FM broadcast frequency band of about 88 to 108 MHz is preferred because it is virtually a worldwide standard. In some Asian countries, however, the broadcast FM radio band is about 86 to 104 MHz. In order to accommodate both, therefore, the receiver could be preset to scan from about 86 MHz. to 108 MHz. Additionally or alternatively, the receiver may be designed to scan other radio frequency bands, such as television bands, cellular telephony bands and maritime bands (e.g. LORAN-C).

The preset times may be set according to the path being traversed and the resolution required. For example, where the entity or object is to travel by sea, the intervals between the preset times may be longer than the intervals between preset times when the entity or object is to travel by road.

The analysis of the stored frequency records to determine the geographical locations of the corresponding antennas may also take into account unique identification data incorporated into their transmissions by the radio broadcasters. The use of such additional information may greatly improve determination of the geographical area within which the set of transmissions were detected by the tag and reduce mis-correlation to negligible levels.

For some applications, the data record created by the tag may include environmental data acquired from one or more sensors in or associated with the tag, for example, motion, temperature, light level, and so on. Such environmental data may enhance determination of the tag locations at the preset times.

Various objects, features, aspects and advantages of the present invention will become more apparent from the following detailed description, in conjunction with the accompanying drawings, of a preferred embodiments of the invention.

DESCRIPTION OF THE PREFERRED EMBODIMENT

The present invention is predicated upon the fact that, typically, within a specific geographical area, a radio receiver will receive a wide range of man-made radio frequency (RF) signals including the broadcast commercial (AM radio, FM radio, TV, etc.) signals and private (communication, cellular, satellite, etc.) signals. Such RF signals form a frequency spectrum or RF signature that is unique to that specific geographical area. Databases are available that contain geographical locations (latitude, longitude) of transmission antennas associated with the frequencies of the signals transmitted from each such transmission antenna. Consequently, it is possible to construct a RE spectrum for a particular geographical area by identifying all of the antennas in the area and combining their transmission frequencies as provided by the database.

Such a database is owned by RadioSoft Corporation, of Demorest, Ga. 30535, USA and accessible to subscribers via the Internet. Embodiments of the invention trace the journey taken by an object or entity of interest by capturing such unique frequency spectra or RF signatures at different locations during the course of the object's travels and then correlating them with a collection of previously-obtained reference frequency spectra or RE signatures to determine where the object was when each RF signature was captured.

Figure 1:
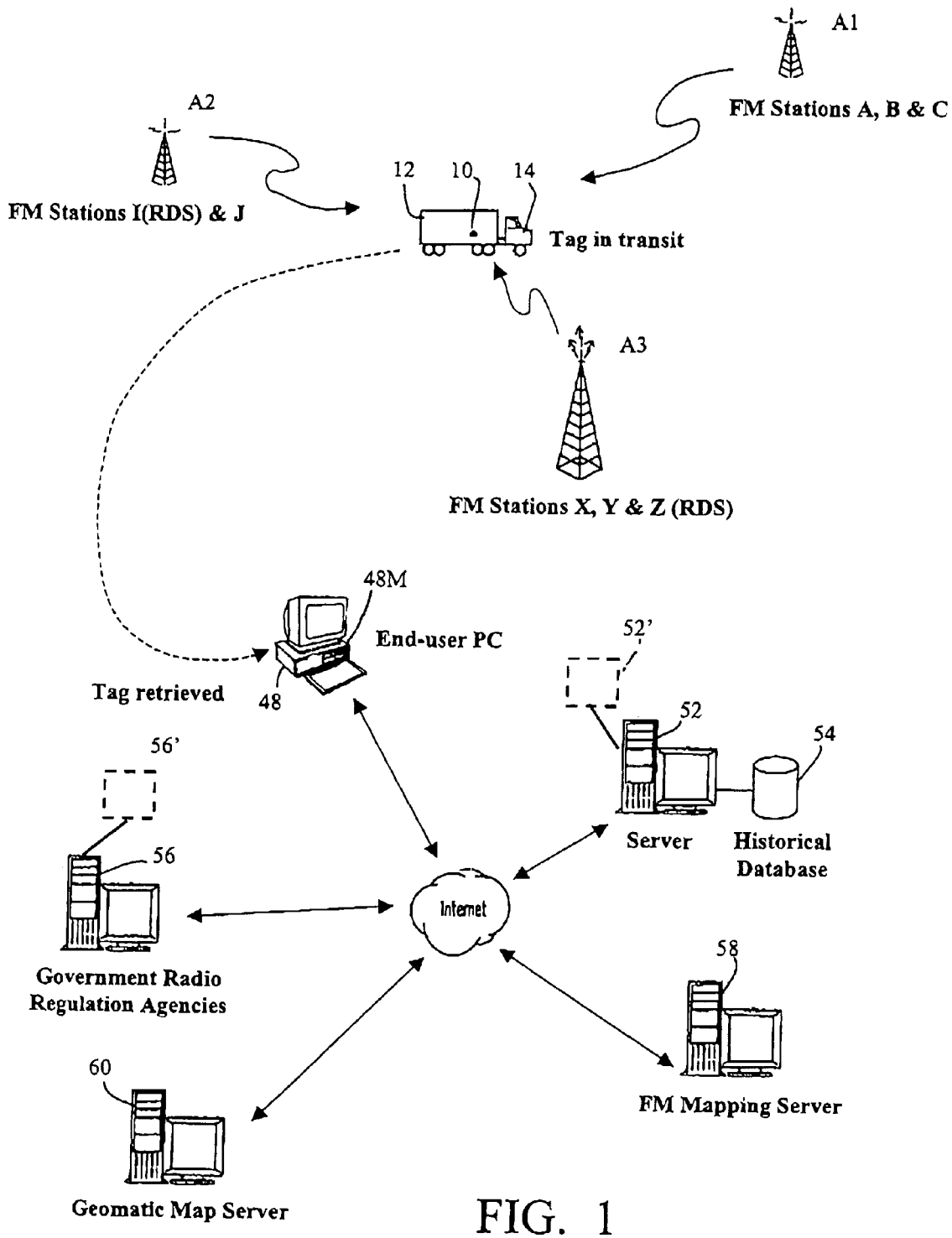
FIG. 1 is a schematic representation of a first embodiment of the invention, specifically a system for tracing paths taken by entities or objects by means of a radio receiver tag travelling with the entity or object.

As illustrated in FIG. 1, embodiments of the invention employ a tracer tag 10 containing a miniature RF receiver which accompanies the entity or object being traced, in this case a shipping container 12 carried by a vehicle 14.

During the travels with the object/entity 12, the tracer tag 10 will encounter a variety of different broadcast radio signals. Thus, at the location shown in FIG. 1, the tag's radio receiver will receive signals from three transmission towers A1, A2 and A3. Usually, several FM stations will transmit from the same tower. Thus, tower A1 transmits signals of FM stations A, B and C, tower A2 transmits the signals of FM stations I and J, and tower A3 transmits the signals of FM stations X, Y and Z. The signals of stations I and Z include RDS data (to be explained later).

Figure 4:
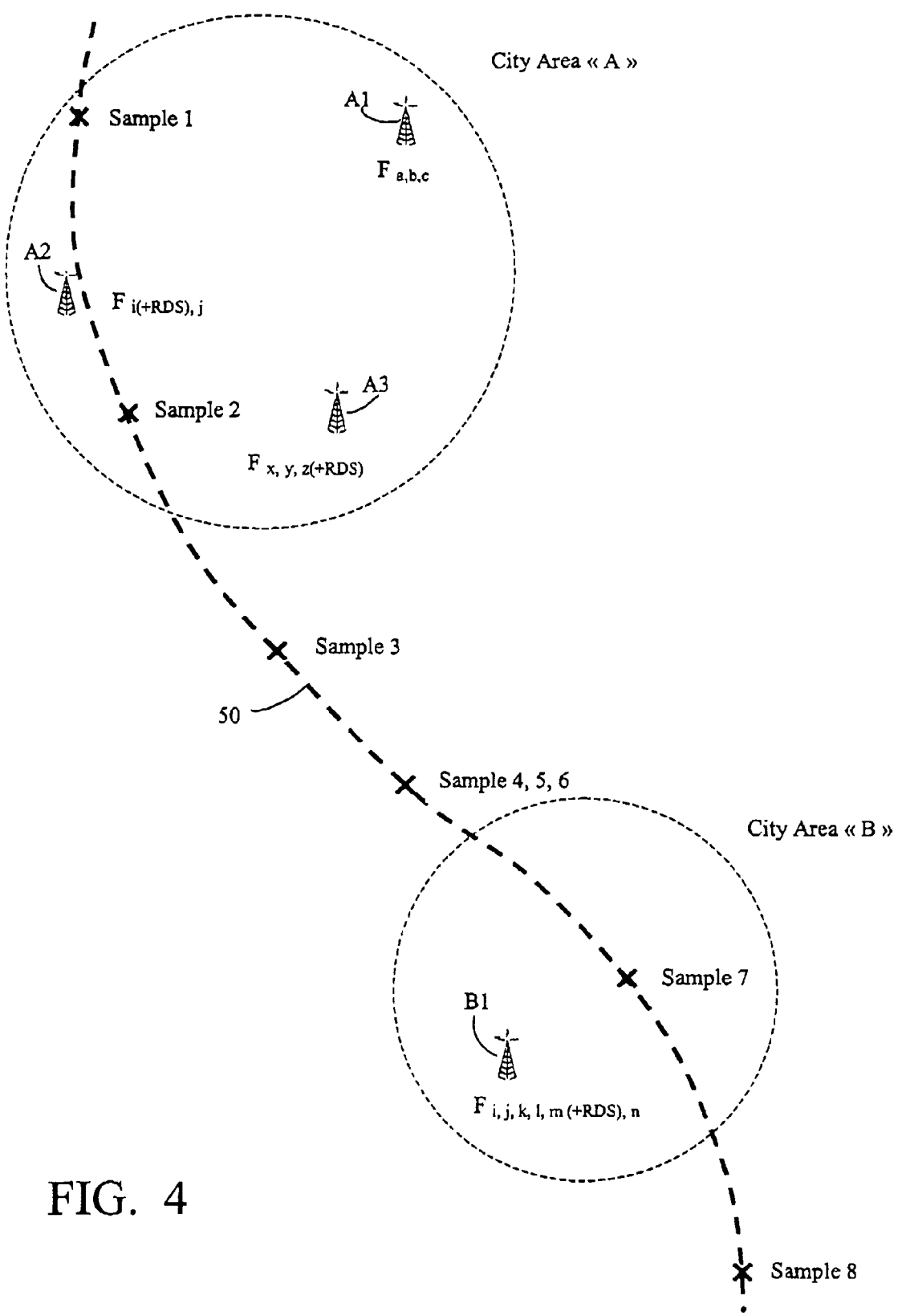
FIG. 4 illustrates exposure of the tag to different sets of radio signals during its travels.

As also illustrated in FIG. 4, at sample point 1 in city area A, the signal strengths of signals $F_{a,b,c}$, $F_{i(+RDS)j}$, and $F_{x,y,z(+RDS)}$ received from transmission towers A1, A2, and A3, respectively, may far exceed those of other stations as a result of a combination of proximity and transmitted signal strengths at their respective broadcast frequencies.

As the tracer tag 10 travels along the desired path, identified by broken line 50 in FIG. 4, the signal strengths of the received station signals will change and, eventually, some of the signals will no longer be detected, being replaced by signals from other stations in closer proximity to the tracer tag 10. Thus, at sample point 7, signal $F_{i, j, k, l, m(+RDS), n}$ from transmission tower B1 might dominate the scanned frequency spectrum.

Typically, the receiver will scan the predetermined FM band at 200 kHz or 100 KH increments and encode the signal strength, at every increment, with a resolution of, say, 12 bits, equivalent to a dynamic range of 72 dB. Hence, if the scan increment is 200 kHz over a 20 MHz band, each frequency spectrum data record, as stored by the tag, will comprise 100 frequency samples which, with 12 bit conversion requires only 1200 bits or 150 bytes of data. The size of the memory unit 20 and the sampling intervals will determine how many data records can be stored. Where sampling is infrequent, the tag 10 might have enough capacity for years of operation, limited, perhaps, by battery life.

Figure 2:
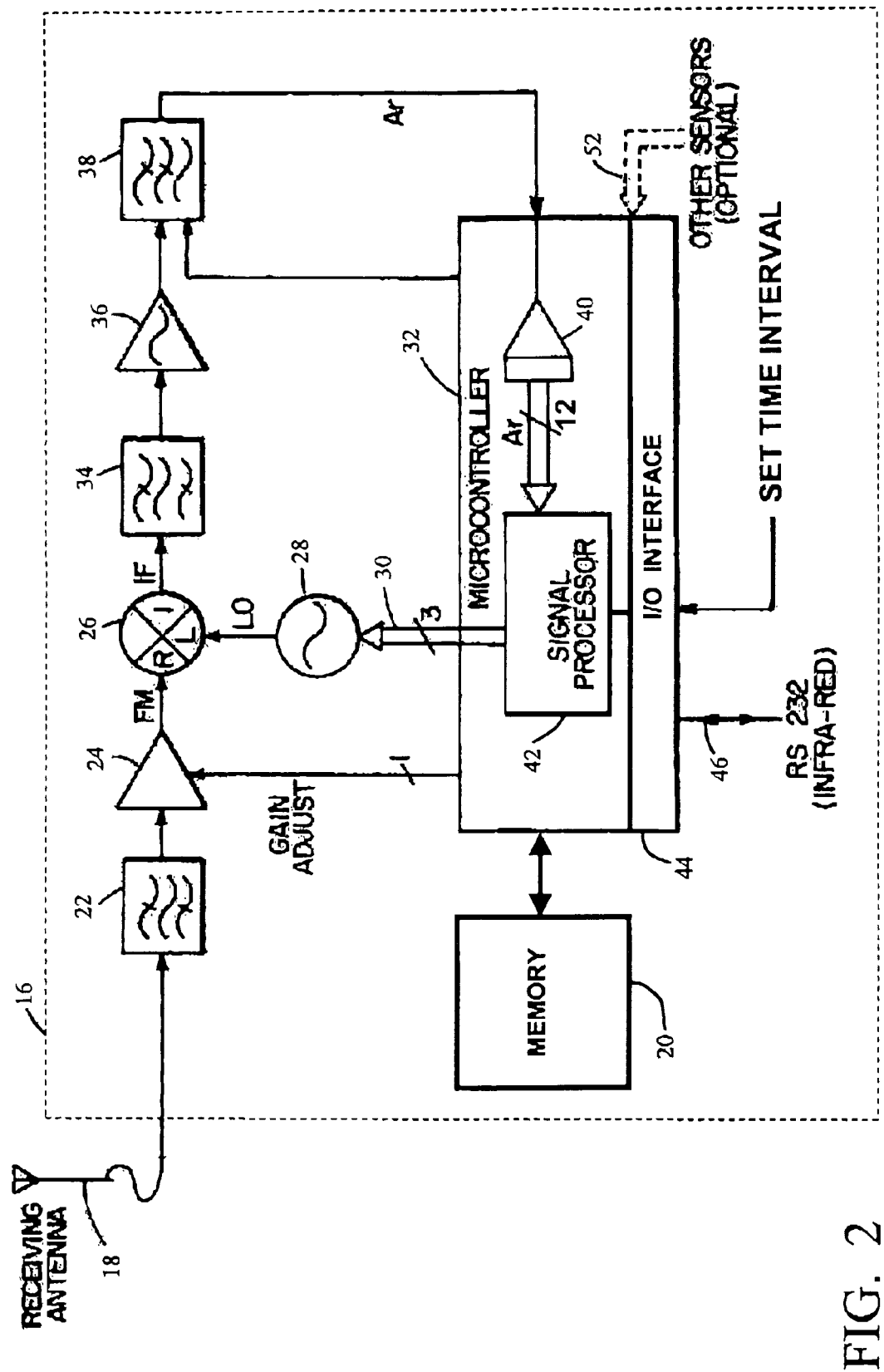
FIG. 2 is a simplified schematic diagram of the radio receiver tag showing a radio receiver unit therein.

As illustrated in FIG. 2, the receiver tracer tag 10 comprises a radio receiver unit 16 coupled to miniature antenna 18, which receives commercial RF signals. The receiver unit 16 scans the predetermined frequency band incrementally and, at each step, extracts the signal strength. Each signal strength reading is digitized by the said receiver and stored in permanent non-volatile memory 20. For embodiments of the present invention, it is preferred to use a receiver which scans the public FM broadcast frequency band of about 88 MHz to 108 MHz because it is a substantially worldwide standard. However, in some Asian countries the FM band is from about 86 to 104 MHz, so, to accommodate both bands, it may be desirable for the receiver to scan from about 86 to 108 MHz.

In most countries, the public broadcasters transmit at frequencies set to 87.7+(m×0.2) MHz., where m is an integer, i.e., the tuning increments or steps are 200 kHz. In some European countries, however, for example Italy, some broadcasters transmit at frequencies set to 87.7+(m×0.1) MHz, where m is an integer, meaning that the receiver step size should be 100 kHz rather than 200 kHz.

In the receiver unit 16, the radio frequency signal received from the associated antenna 18 is coupled to a bandpass filter 22 which restricts the radio signal to the FM spectrum from about 86 MHz. or 88 MHz. to 108 MHz. and passes it to a low noise amplifier 24. The amplified signal from amplifier 24 is down-converted to an intermediate frequency (IF) signal of 10.7 MHz. by a mixer 26 which derives its local oscillator signal (LO) from a phase-locked loop oscillator (PLO) 28, The PLO 28 is controlled, via bus 30, by a microcontroller 32 which, at preset times throughout the journey by the object or entity (and tag), activates the receiver unit and causes the local oscillator frequency to scan the spectrum in steps of 200 kHz. which, as explained above, is the usual spacing between FM radio stations in most of the world. (Of course, the steps could be 100 kHz. if preferred.)

For each frequency step, the down-converted IF signal from mixer 26 is filtered by a second bandpass filter 34 having a bandwidth of 300 kHz. centered upon the IF frequency. The magnitude of the output from second bandpass filter 34 is measured using a logarithmic amplifier 36. The analog signal from the logarithmic amplifier 36 represents the amplitude of the radio frequency signal for a selected station and is filtered by a low pass filter 38 having a cut-off of 80 Hz. The filtered signal Ar from low pass filter 38 is converted to a digital signal by a twelve-bit analog-to-digital (A-to-D) converter 40 within the microcontroller 32:

The digital signal from A-to-D converter 40 is processed by a signal processor 42 of the microcontroller 32. D.C. power for the receiver unit's components and memory unit 20 is provided from the internal battery (not shown). The microcontroller 32 is programmed to put the receiver unit 16 into an energy-saving mode when not in use, e.g. when not actually capturing a frequency spectrum, so as to reduce power consumption.

Once the frequency spectrum has been digitized, the microcontroller 32 associates with it the date and time of capture (derived from an internal real-time clock), and stores this information, as a data record, in a non-volatile memory unit 20. As will be described later, the receiver unit 16 may also incorporate a FM digital demodulator (not shown) to demodulate each RDS and read each public broadcast station's call sign and associate it with the frequency spectrum in the data record, for use in facilitating the comparison with the reference database spectrum. To save memory space, the real-time, time and date need not be recorded. Instead, the time and date information could be computed retroactively for each captured frequency spectrum, based upon the time and date the data was downloaded from the tag and with knowledge of the time interval between the preset times at which the frequency spectra were captured.

Figure 3:
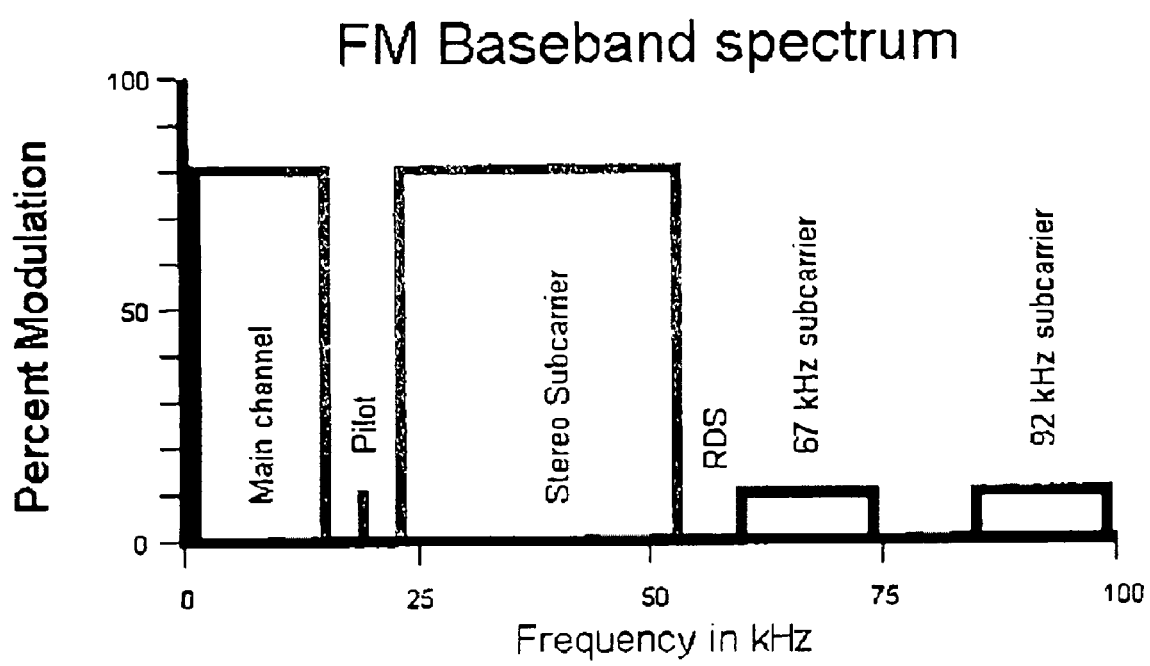
FIG. 3 illustrates the assignment of frequencies used by an FM transmitter.

As shown in FIG. 3, which shows the assignment of frequencies used in an FM transmitter, at 57 kHz there is a RDS subcarrier which may be used to carry identification information, such as the commercial broadcast station's call sign and information about the programmed content. Although use of the RDS feature is not yet worldwide, it is becoming common practice among industrialized countries. Consequently, whenever possible, the receiver unit 16 demodulates the RDS subcarrier, decodes it to obtain the station's call sign, and records the latter along with its signal strength.

The microcontroller 32 has an I/O interface 44 which, by mean of an RS 232 port 46 enables the captured data records to be transferred from memory unit 20, conveniently by means of an infra-red coupling to enable the data to be downloaded to an end-user's personal computer 48 (FIG. 1) once the tracer tag 10 has been retrieved at the end of its journey with the object/entity. The tracer tag 10 may then have its battery recharged (if necessary) and the present time interval reset by way of the infra-red I/O interface, before the tag 10 is re-used.

Before use, the tracer tag 10 battery must first be charged, the microcontroller 32 set to record FM spectra at desired preset time intervals and the tracer tag 10 associated with the entity or object whose path is to be traced, for example hidden upon it for later retrieval. The tag 10 receiver unit 16 may be activated by any suitable means; for example by tapping the tag a number of times within a certain time interval, if it contains a motion-activated on/off switch.

Once the tag 10 has been activated, the microcontroller 32 will track the time and, at each preset interval, turn on the receiver unit 16, which will detect the radio frequency signals to which it is exposed. The microcontroller 32 will control the receiver unit 16 to scan and sample the radio frequency spectrum, measuring the signal strength at each increment of the frequency spectrum and storing the data in associated memory device 20.

The personal computer 48 is used to upload the recorded FM spectrum data via the Internet to a server 52 having access to a database 54 of historical reference FM transmitter antenna tower activities which as described above, are used to construct reference FM frequency spectra in order to extract the geographical trace.

The server 52 has a web-based RF spectrum correlation engine program (not shown) which compares the uploaded frequency spectra with constructed frequency spectra from the database to determine where the tracer tag 10, and hence the entity or object 12, was when each individual spectrum was captured.

Thus, the historical database of records of known FM transmission antenna towers is used to construct the frequency spectra of the geographical locations within the search area. In the database 54, each FM transmission antenna tower data record contains not only the radiated power level for each of the transmitted frequencies but also the coordinates (latitude, longitude, elevation) of the geographic location needed to construct the spectrum, together with the applicable date and time and, where applicable, station call signs. Typically, publicly-available databases of FM transmission spectra (FCC, EU equiv., CITT, CRTC branch of Industry Canada "IC" in Canada) are updated frequently, say every six hours, as it is well know that FM broadcasters go off the air for a few hours, normally during the night, two or three times a year for antenna maintenance purposes. Also, some FM stations close permanently and others commence operations. Consequently, each FM spectrum taken at a particular location is dynamic as it changes over time.

The frequency spectrum measured by the tag 10 at a particular location, and hence at a particular time, must be compared with constructed frequency spectra comprising signals that would have been transmitting at that particular preset time Consequently, the reference database is historical and stores transmission activities of FM broadcast antenna towers taken over a period of time that is long enough to ensure that the required spectra are available when the data is being retrieved and compared.

Hence, the worldwide historical reference database 54 also may be updated every six hours by downloading, via the Internet, the latest transmitting activities of broadcast antenna tower data either directly from a government web site server 56, such as the FCC server, or from the website server 58 of an intermediary, e.g. a private organization such as Radiosoft whose website RadioSoft.com is known as the most popular private web site that supplies quasi real-time FM signal strength contours for every registered broadcaster, worldwide.

In order to facilitate comparison of each captured frequency spectrum data record with the appropriate historical data, when obtaining each frequency spectrum, the receiver unit 16 also collects the date/time information for subsequent use in matching the measured frequency spectrum with the records in the historical database for the same time and date.

The web-based spectrum processing engine 52' on server 52 constructs the regional RF spectrum for each geographical location based upon the activity information of each FM broadcast antenna tower in the search area. The area is defined in terms of a radius around a specific pair of survey coordinates. Time and date information is also processed for each sample, i.e., captured spectrum. For example if the city area A of FIG. 4 were the same as the search area, all of the signals from towers A1, A2 and A3 would be identified as within the search area, This group of signals constitutes what will be called a "constructed" frequency spectrum for area A.

Figure 6:
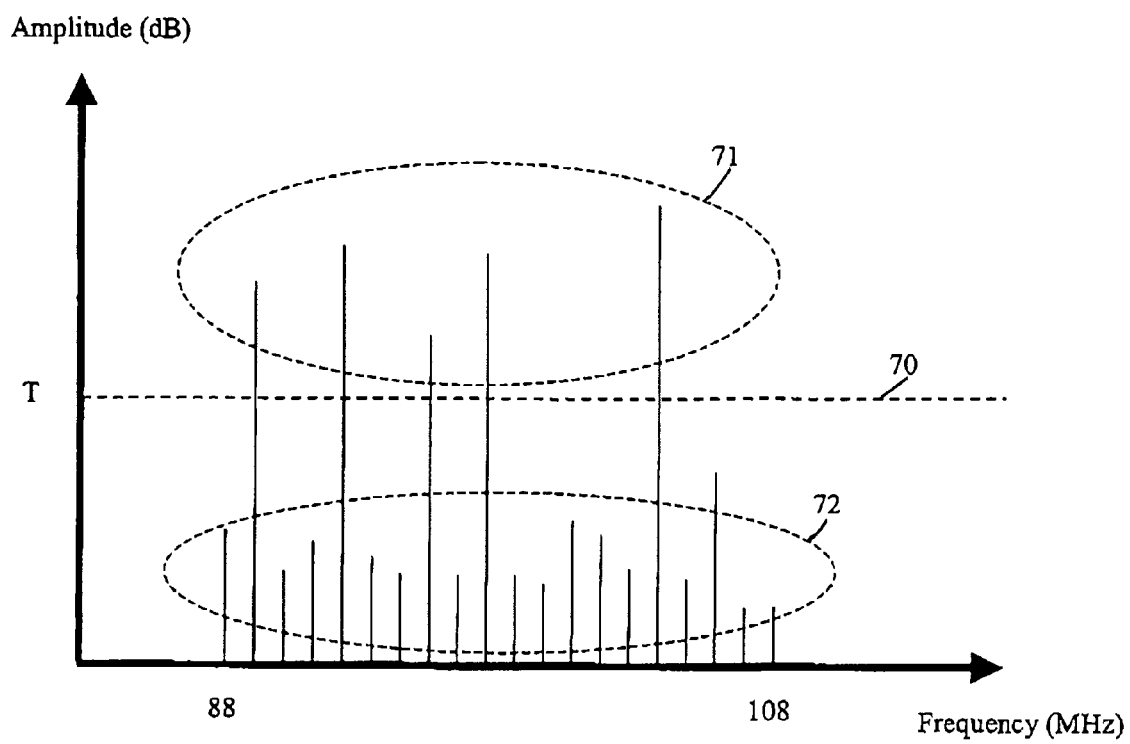
FIG. 6 illustrates a typical radio frequency spectrum as scanned by the radio receiver of the tag.

Before seeking to correlate this constructed frequency spectrum with those captured by the tag 10, the correlation engine 52' processes the tag's raw captured spectra to screen out noise, including weak stations. FIG. 6 illustrates a typical raw captured frequency spectrum in which a group 71 of only five broadcast signals exceed a threshold 70 at a signal strength T.

Once the engine 52' has processed all of the captured frequency spectra to eliminate the noise and weaker signals 72, it proceeds to compare them in turn with the constructed frequency spectrum for the search area. Again, if city area A is the search area, the correlation engine should find two captured spectra (sample 1 and sample 2) which correlate.

This process is repeated until all of the captured spectra have been correlated with one or more transmission towers along the path travelled by the tag 10 and entity/object 12.

At this point, the correlation engine has a series of survey coordinates which identify the locations of the transmission towers along the path of the tag 10. This information, typically as latitude and longitude pairs, could be supplied to the end-user PC 48 to enable the end-user to trace the path, for example by reference to a suitable set of maps.

However, as illustrated in FIG. 1, once the overall regional information is obtained, the correlation engine 52' may send each pair of latitude/longitude coordinates to a web-based geomatic mapping server 60 and download therefrom a geographical map showing the tag's path overlaid upon it. This is analogous to a driver, for example, obtaining a route from a geomatic database similar to that accessible at the website www.mapquest.com of Mapquest Inc.

Having obtained the map and overlaid trace from the geomatic server 60, the correlation engine 52' transmits the information back to the personal computer 48, to be displayed by the PC monitor.

Thus, the information from the correlation engine 52' could be provided to the end-user as simply a list of coordinates of points along the path travelled, or a graphical representation similar to that shown in FIG. 1, or even a series of place names.

As noted above, when constructing the constructed spectrum, the correlation engine 52' does not differentiate spatially between the signals from the different towers in the group or take into account the terrain in the search area. However, the typical government database 56 will usually have additional data, e.g. tower elevation, which private database suppliers, such as RadioSoft, process to provide detailed FM mapping contours, for example as provided on their web site.

It is envisaged, therefore, that the embodiment described above could be modified to allow the spatial and elevational information to be used to enhance the correlation process and obtain better resolution as to the location of the tag 10 when a particular frequency spectrum was captured.

Thus, in such a case, once the correlation engine 52' has obtained the survey coordinates for the towers in the search area, it will send that information to a FM contour mapping server 58 which will use the information to access its own data and generate a FM contour map for that area and return it to the correlation engine 52'. At this point, the correlation engine will compare the raw captured frequency spectrum in question with the FM contour map data to determine more closely the location of the tag 10 relative to the towers within the search area when the raw frequency spectrum in question was captured. Hence, the correlation engine performs a coarse analysis using the constructed spectra and follows that with a finer analysis using the FM mapping contour data.

Construction of the historical database 54 and the correlation process carried out by the correlation engine will now be explained more fully with reference, where appropriate to the flowchart of FIGS. 5A, 5B and 5C.

a) Constructing the "Historical FM Station" Database from Government Agencies.

FM stations are known to be extremely reliable. Indeed, within their Incorporation Act, broadcast services must remain operation even during major countrywide disasters to allow government authority maintaining contact with its citizen. FM station radiating more than 100 kW must be equipped with UPS and self-power generation to maintain power autonomy with no duration limitation. However, in reality, some FM broadcasters cease commercial operation and others new ones arrive on the market. Extensive regulation of the FM band allows government control of the spectrum. Hardware maintenance activities that required temporally shutdown are normally conducted twice a year and during low audience hours, e.g. 3:00 am. Although they appear very reliable and stable, FM spectra have some level of dynamic.

In order to compare the FM spectrum captured by the tracer tag 10 without any chance of introducing database error, it is mandatory that the correlation be done between data that belong to same time period. For example, if the tracer tag 10 happens to scan and store a FM spectrum while FM broadcast at frequency XY.Z in city ABC is temporally off air, it should be expected that correlation will be done with a FM database that excludes frequency XY.Z in city ABC. To do so, a "historical" FM station database must be constructed.

The construction of the historical FM station database is a novel aspect of the invention. Being heavily regulated by government agencies (i.e. FCC in USA, IC in Canada), a worldwide FM database of FM broadcast transmitter activities is constructed based on sub-daily (i.e. FCC refresh rate is four time per day) information available from government agencies worldwide. The database includes a collection of worldwide broadcast antenna including, survey coordinate, elevation, frequency, antenna radiation pattern, radiation power and RDS (optional) qualified by ON-OFF air. Also, it should be noted that some broadcasters reduce radiation power at night to save power consumption. Such information is also collected.

b) Extracting the "Historical FM Spectrum" from the "Historical FM Station" Database FM broadcasts, operating in the VHF band 88 to 108 MHz, present a well known radiation behavior that is almost independent of environmental and climatical conditions. At the opposite end, AM broadcasts are known to have a longer propagation distance at night, versus day light conditions, due to stratospheric reflection and creation of "waveguide" effects caused by cold-hot air high altitude conditions. To that effect, radiation patterns, forming FM mapping (likewise altitude mapping contours) of constant FM broadcast receiving power is mathematically very predictable. Some companies (e.g. RadioSoft) specialize in computing and supplying FM mapping contours worldwide via the web. Since none collect "historical" data, the combination of the "historical FM station data" with the "FM mapping contour" will allow the "historical FM spectrum" to be constructed for the period (date-time) corresponding to the period during which the FM spectrum data was captured by the tracer tag 10 10 in the vicinity of the known geographical area.

c) Extracting the Tag 10 "Path" from the "Historical FM Transmitter Tower" Database and FM Data Stored in the FM Tag.

Figure 5A:
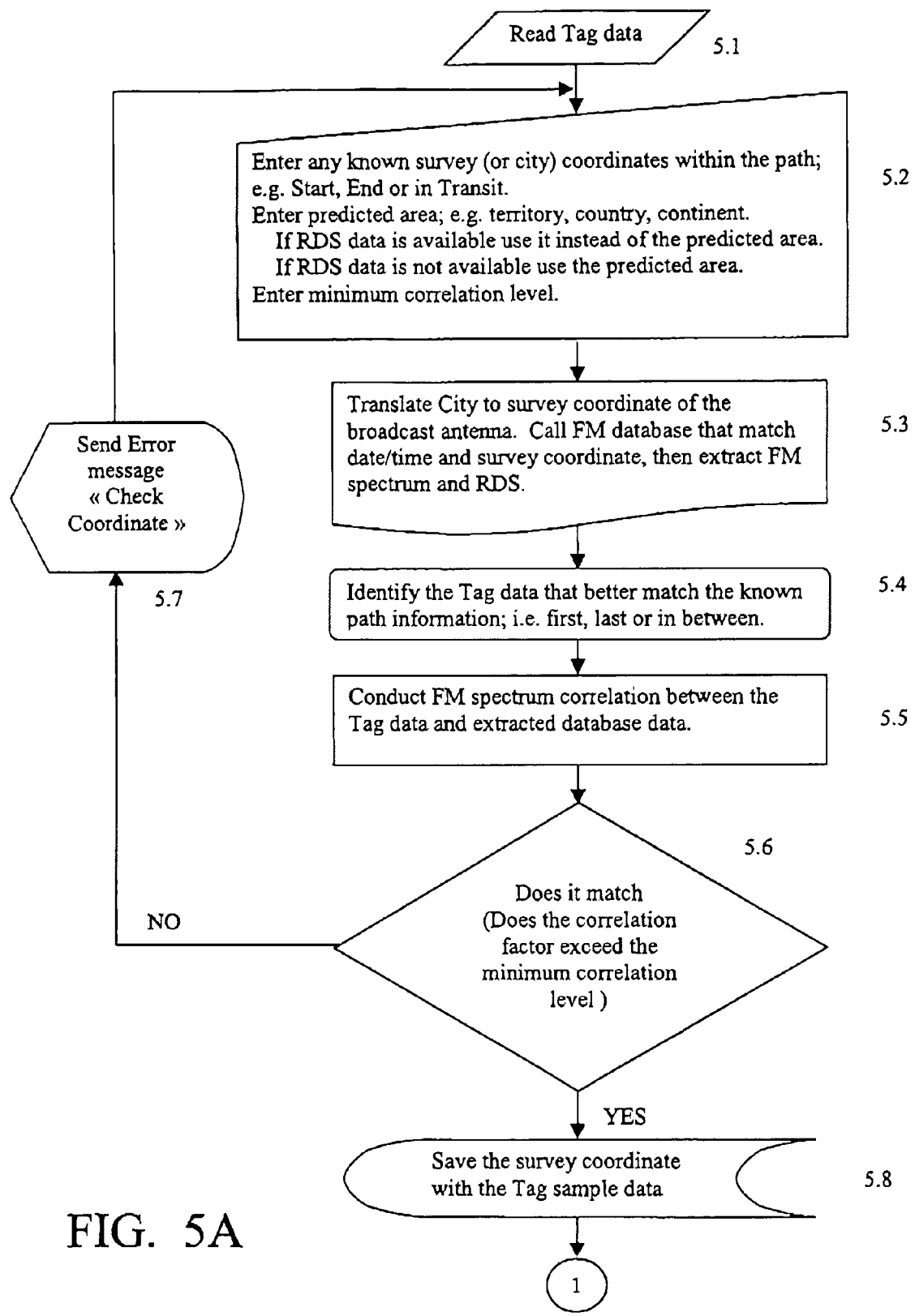
FIGS. 5A, 5B and 5C are respective sections of a flowchart depicting operation of the system, specifically a correlation process which compares frequency spectrum data records stored in the radio receiver tag with frequency spectra constructed from historical records of FM frequencies transmitted by antenna towers and stored in a database.
Figure 5B:
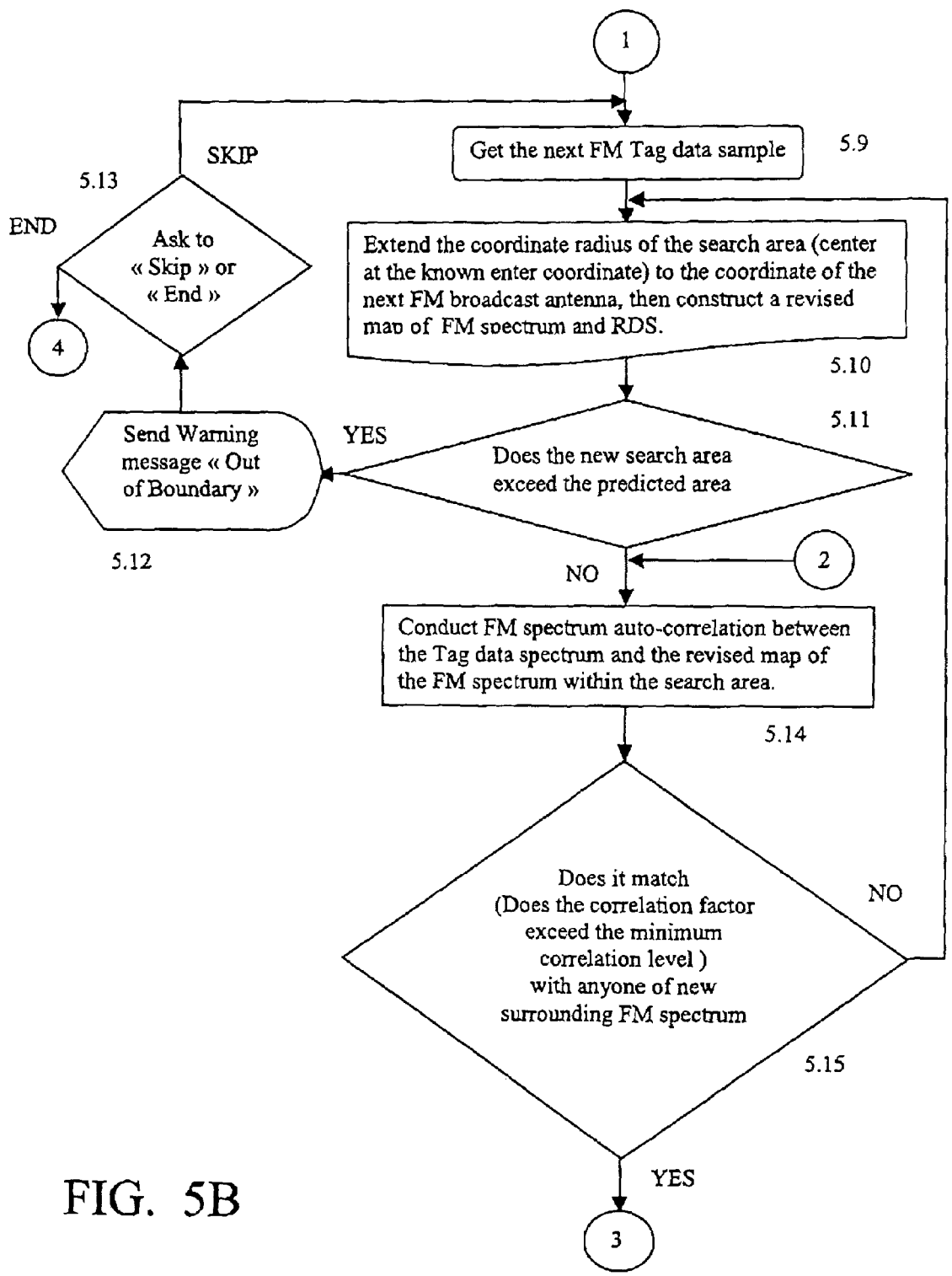
Figure 5C:
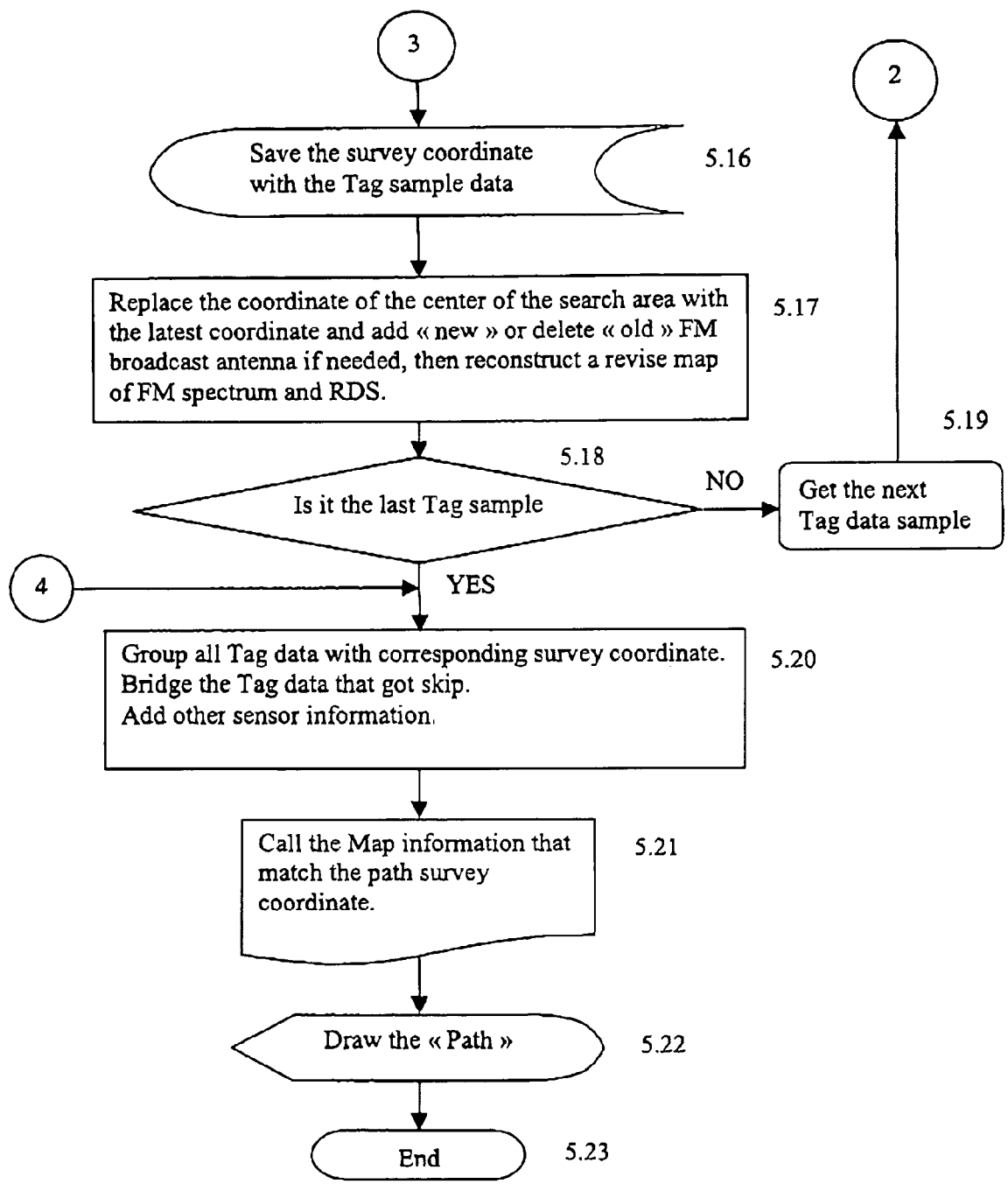

The operation of the web-based correlation engine in comparing the captured frequency spectra with the historical database of reference spectra, and determining the path travelled by the tag, is depicted in FIGS. 5A, 5B and 5C. The technique used to extract the "path" assumes that the end-user is capable of identifying a minimum of one known area (or city), most likely the "end" or the "start" ordnance survey coordinates or any other interim coordinates. In the event that the end-user does not know, he will be invited to guess to the best of his knowledge.

It should be noted that, in embodiments of this invention, the proposed technique (correlation process) will converge even if the guessed coordinates are totally wrong. Precision and accuracy in the known coordinates will allow extraction of the "path" with less processing power, and hence more quickly.

Referring to FIG. 5A, the FM spectrum and, where applicable, the RDS for every sample permanently stored in the tracer tag 10 are read (step 5.1), via the infrared (wireless) interface, by the PC (48) of the end-user that has retrieved the tracer tag 10 with the intention of extracting the "path" data. The read data is downloaded to the "GeoPath" server 52 for further data analysis. The "GeoPath" server 52 prompts the end-user to enter, in Step 5.2, "known" survey coordinates, e.g. survey coordinates, city name, etc. to define one or more points known to be on the path, such as Start, Finish or an intermediate "in transit" location, followed by a predicted area (general region) through which the tracer tag 10 has travelled. If RDS data is available, that may be entered. The "minimum correlation level" then is entered to define the level of minimum correlation factor that must be maintained for each data sample; otherwise the data sample is rejected. The survey (latitude, longitude) coordinates are obtained from the web-based geomatic server 60. The record date and time are attached to the survey coordinates.

In step 5.3, a "historical FM spectrum" is constructed from the "historical FM station" database in line with the recorded period, based on the FM stations surrounding the given survey coordinates. In step 5.4, the constructed frequency spectrum is compared and correlated, in turn, with each of the captured FM spectrum data records from the tracer tag 10 to identify the captured frequency spectrum that most closely matches (i.e. has the highest correlation factor) the said constructed FM spectrum. Before doing so, however, the engine 52' compares each captured spectrum with the threshold T, as previously described, to eliminate noise and weaker signals.

The highest correlation factor is compared (step 5.6) against the entered minimum correlation level and prompts an error message (step 5.7) if it is less or equal. If it is greater, the sample that presented the highest autocorrelation factor is identified as the "start point" sample and saved 8 with the ordnance survey coordinates.

The next captured data record 9 is obtained. The search area associated with the "start point" is extended (10) until at least one more FM broadcast antenna is added, then a revised map of FM spectrum and RDS is constructed. The extended search area is compared (11) with the entered predicted area (5.2) and prompts a warning message (5.12) if exceeded. The end-user then is asked (step 5.13) to decide whether to "skip"

or "end" the data analysis. If the end-user chooses to "end", then creation of the path (5.20) is commenced. If the end-user decides to "skip, then the next sample or captured data record (5.9) is obtained and process step 5.10 is repeated. If it does not exceed 11, then correlation (5.14) is conducted between the revised map of FM spectrum present in the search area and the FM spectrum associated with the said next tracer tag 10 data record. The correlation (5.14) is done by comparing the said next Tag 10 FM spectrum record with each one of the FM spectra records available within the map of FM spectra and the one with the highest correlation factor is selected. As before, such highest correlation factor is compared (5.15) against the entered minimum correlation level (5.2). If this highest correlation factor does not exceed the minimum, then the search area is extended (5.10) and the process steps (5.10) to (5.14) are repeated until a correlation factor exceeds the minimum correlation factor (5.15) or the search area exceeds the predicted area 11. If the said highest correlation factor does exceed the minimum, then the survey coordinates associated with the highest correlation factor are saved (5.16) with the said next 10 sample data record. The search area is updated by replacing (5.17) the center coordinates of the search area with the latest coordinates, i.e., of the sample having the highest correlation factor. The engine then checks, by moving the search area, if new broadcast antenna need to be added or old need to be deleted, then reconstructs the revised map of FM spectrum and RDS. If the said next Tag 10 sample data is the last sample (5.18) then the same process is repeated starting from the said "start point" sample, going into the opposite direction. If it is not the last sample, the engine gets the next sample (5.19) and repeats the correlation (5.14) within the same search area.

d) Displaying the Tag 10 "Path"

Step 5.20 groups all Tag 10 data with corresponding survey coordinates. For a "start point" within the "path", the two sub-paths are grouped together. (If the "start" point is actually the path start or end, the path is obtain in one piece. But if the "start" is anywhere along the path, the process described here will generate 2 path pieces or sub-paths that are joined by the start point) If some sample data got skipped 13, the skipped data is interpolated. Information pertinent to other sensor data may then be added. In step 21, the engine then uses the coordinates to "call" for map information from any suitable web-based map provider 60 (e.g. similar to MapQuest) that matches the "path" survey coordinates to "box in" the usual square map shape, The engine then generates a display on the monitor 48M of the PC of the end-user (23) showing the "path" travelled by the tracer tag 10 overlaid upon the map obtained from the map provider. When finished, the correlation engine prompts the end-user for any future mission of the tag 10 and revises the preset times, if needed. The engine also prompts the end-user to erase the tag 10 data.

Thus, at the end of each journey, or after a number of journeys, the RF trace tracer tag 10 can be initialized and set with a different sampling sequence interval so that it is ready for its next tracing mission.

It will be appreciated that correlation of the raw captured frequency spectra with the reference database spectra would be simpler and less expensive, in terms of processing time and power, if the correlation process were limited, at least initially, to a sub-group of the reference spectra. This restriction could be based upon information supplied by the subscriber when uploading the captured data to the RF correlation engine 52.

Additionally or alternatively, correlation could be simplified and/or enhanced by also using the station's call sign, which would allow extraction of the exact geographical location of each record point along the geographical path or trajectory. In fact, if sufficient broadcasters include RDS data in their transmissions, then that data alone could be used to identify the required location data.

Although the above-described receiver tracer tag 10 scans the FM broadcast frequency band, for some applications it might be desirable to scan a different band, or several bands, such as AM, FM and VHF TV commercial broadcast signals. The low frequency RF signals are very strong (covering more than 90% of earth ground) and propagate reasonably well through buildings and other man made constructions. Low frequency broadcast signals also have the advantage of "over the horizon" propagation, which contributes to the quasi-full RF earth coverage. On the other hand, the higher frequency signals provide better spatial resolution, so a combination may be preferred. Indeed, future digital radio and TV systems that operate at much higher frequencies will allow this technique to give better location accuracy.

For maritime applications, the predetermined band may be the LORAN-C band.

Since a trajectory is composed of multiple sample locations, the known geographical information can be used to obtain a realistic trajectory. Example: for a trace tracer tag 10 10 travelling by car from New York city to Wash. DC, if one sample spectrum data is identified as being somewhere in Europe, such sample data should be rejected, especially if the time interval made such traveling distance impossible.

The correlation factor or accuracy figure is a function of the number of samples, number of rejected samples, number of known set of data records based on broadcaster IP (i.e. its station's callsign), etc. A correlation factor can be extracted and displayed for each of the captured frequency spectra forming the trace. Such correlation factors can be useful when the trace information is part of (or used as) evidence in a court case. It should be noted that a correlation factor of 100% could be obtained where the captured data record consisted of a collection of at least one station's call sign ID recorded for every sampling of the captured frequency spectrum.

The tracer tag 10 does not have any means of transmitting its recorded FM spectra data in real-time; hence the tracer tag 10 must be retrieved to extract the data. This limitation is applied voluntarily in order to avoid infringing individual privacy rights when the tracer tag 10 is hidden on a person.

As indicated above, if RDS is used, the coordinates of the transmission towers can be determined from it and used in conjunction with FM mapping contours for the area to give the tag's exact location.

As shown in FIG. 2, the receiver unit 16 may have an input 52 for inputting via the I/O interface 44 information from environmental sensors, for sensing, for example, temperature, acceleration, light level, atmospheric pressure, etc. This sensor information can be integrated with the spectrum information for display with the trace. As an example, an tracer tag 10 hidden in a piece of luggage of a person taking a flight usually will show a sudden absence of FM signals when the aircraft is in transit between two cities. It is known that atmospheric pressure inside the airplane cabin could be around 80% lower than ground atmospheric pressure. Consequently, if the data supplied to the correlation engine 52' included readings from an atmospheric pressure sensor in the tracer tag 10, the correlator engine 52' could use it to conclude that the tracer tag 10 was in an aircraft in flight between two airports and hence display such additional information along with the trace. This information could be depicted (say in broken lines) in the map showing the trace of the path.

Similarly, accelerometer readings would allow an indication as to whether the tracer tag 10 was in motion or at a standstill at various locations along the trace. Readings from biorhythm sensors would allow correlation of body conditions with the location information, which could be of interest in cases where the tracer tag 10 must be worn at all times by an entity whose movements are being traced.

Application of the present invention is very wide. Without restricting application of the invention, the following applications are given by way of example:

a) Private or legal investigation of people conducting business or private traveling. The tracer tag 10 could be hidden in the luggage of a suspect person and, upon returning home, the tracer tag 10 retrieved and the path taken, city by city, since departure, plotted.

b) Cargo port inspection. It is well know that only 5% of maritime cargo containers are physically inspected at major seaport. The point of departure, point of temporary disembarkation and point of final destination could form the basis for a port authority to decide whether or not to conduct an inspection of incoming shipments. A radio receiver tracer tag 10 could be permanently mounted on every maritime cargo container, reset at the point of departure and interrogated at the point of arrival. Reliable worldwide tracing information will allow port authorities to make better decisions. It should be noted that, for maritime applications, the LORAN-C frequency band can replace or be added to the FM band and any other bands scanned by the receiver.

c) Rental car companies apply insurance according to countries being visited. This reality is even more pronounced where the vehicle crosses a border between countries with significant economic differences (e.g. USA and Mexico, Western and Eastern Europe, African countries, etc.). In this special case, the existing vehicle's on-board radio receiver could be used substantially "as is", with minor modifications to interface to it the storage and reader circuitry required to provide the functions of the present invention. When the vehicle was returned, the rental company would be able to download the captured frequency spectrum data and use it to determine where the vehicle had travelled during the rental period.

d) Livestock animals and bio-alimentation. Increasingly in order to control animals spreading disease (e.g. mad-cow disease), international regulations demand traceability for all such livestock.

In embodiments of the present invention, a tracer tag could be installed on each animal with preset time intervals set to, say, 1 week or longer. The tracer tag 10 data could be retrieved and stored, for example, when the animal was received at an abattoir.

It is also envisaged that, where the tag 10 is worn by an animal or person, the tag 10 could be powered by means of a thermocouple source of energy, or other source such used in current pacemakers.

e) Migration control. Since the tracer tag 10 is so small and of low weight, it could be installed on a bird's leg or foot (like a ring tag 10 as used hitherto). A biologist or other expert then could retrieve the tag 10 periodically, in the usual way, and retrieve the data to determine where the bird had been since the tag 10 was installed or previously checked. This would enable more accurate tracing of migration activity than existing techniques. Of course, use of the invention to track migration and so on is not limited to birds but could also be applied to the tracking of other living creatures.

f) Immigration control. Temporary immigrants will be mandated to carry a temporary passport equipped with a tracer tag. The immigrant is to report himself periodically to authorities. During such reporting, the data loaded in the tag hidden in the passport will be used to trace the immigrant's travels between each visit. The immigration authorities will then have valuable information, without the new immigrant knowing it.

g) Release of prison inmates on parole. Inmates on parole must stay within a pre-determined geographical area. A tracer tag could be hidden within their ID card, used to trace information between every report or visit to the parole officer. In the event that someone had a court order that restricted them to stay at pre-determined distance away from someone's residence (often the case on judgment against a violent ex-spouse) a low-power FM transmitter with specific RDS can be installed at the restricted residence area. (Such low-power FM transmitters are commonly used today to broadcast dominical mess to the paroisian on Sunday morning, used to transmit the "house for sale" information where the broadcast FM frequency is shown on the "house for sale" sign) The person that is under a court restriction must carry their ID card at all times, and must report to authorities periodically.

h) Postal service quality control. Every postal service uses multiple point of data entry, all networked to a centralize database. However, there is no means of double-checking that such in-house tracking system is working and safe from human mistake and manipulation. The quality control department will then insert a tracer tag on selected and/or random packages. Upon arrival of the package at its destination, the tag is retrieved and tracing information is compared with an internal tracking system. Disparities could then be addressed and corrected.

i) Dangerous Hazard material (HazMat) in transit. Regulations impose detailed tracking requirements to follow the HazMat at all times and provide a "paper trail". Transportation companies must obey regulations but at present compliance is not strictly monitored by the authorities. Government transport authorities may require the use of a receiver tracer tag 10 on every HazMat container. The transport authority would then be able to trace the path taken by the HazMat, allowing them to enforce the regulations. A particular case might apply to tunnels and bridges. Most HazMat are not allowed to use such critical and vulnerable transport infrastructure. Nowadays, most tunnels have private repeaters to radiate broadcast signals within the tunnel. The tunnel information could then be transmitted via the RDS and recorded by the tracer tag 10. It should be noted that, for HazMat tracability, size and battery dimensions are not important. In such a case the tracer tag 10 could be set to record the radio spectrum at 10 second intervals when in transit. When equipped with a motion sensitive accelerator, the tag 10 can record "moving" versus "standstill" information.

Embodiments of the invention advantageously provide for coarse tracing of the geographical, potentially worldwide, displacement of an entity, e.g., an object, article, person under surveillance at very low cost, in contrast to previously known techniques based on GPS tracking or cellular phone tracking which require expensive and large receivers that operate for only a few days when powered by battery. In embodiments of the invention, the "coarseness" of the tracing can be tailored to the application, allowing global tracing with resolution equivalent to sub-cities or local tracing with resolution equivalent to, say, 100 m. Such local tracing might apply to the above-described use to monitor a violent person approaching an ex-spouses' home.

It is envisaged that the tracer tag 10 may comprise a micro FM receiver costing a few dollars, having dimensions smaller than a 10-cent coin and power consumption so small that it could be supplied by a watch battery for a period exceeding one year.

Although the receiver of the above-described system monitors the FM frequency band, a hybrid system operating on multiple broadcast bands (AM, FM & TV) will present the best of both world in terms of wide coverage and fine resolutions. As mentioned hereinbefore, AM signals are known to cover a wider geographical area due to their ability to radiate "over the horizon", especially at night When used with AM only, the tracer tag 10 must have a real-time clock in order to add time information with the collected AM spectrum, which could be used to compensate for the fact that AM propagation during daytime is less than during nighttime.

Cellular phone technology presents similar characteristics. Indeed, the cellular tower presents a unique RF signature like broadcast signals. However, the information about transmitted signals is proprietary, hence not available to the public, and may require a licensing agreement. A key advantage of using cellular phone frequencies comes from the fact that a regional area is covered with multiple transmitters resulting in finer traceability resolution. On the other hand, cellular frequency signals are not present in remote areas whereas broadcast signals are. Also, cellular systems often have dead spots. An FM broadcast signal, being very wide (20% bandwidth) is equivalent to spread-spectrum. Thus, a dead spot may happen at one specific frequency, but not to all others frequencies, hence the feature of spread-spectrum.

It is expected that, in a few years, all-digital radio and TV broadcast will become available. New frequency bands will then be allocated, When such new digital broadcast becomes available, the techniques described in this patent will remain the same with the exception of operating at different frequencies. However, being all digital, it is expected that broadcasters will transmit much more identification data, i.e. time, date, antenna azimuth and elevation, signal strength. All such information is useful for further improving the performance of embodiments of this invention.

In the event that a broadcaster transmits its antenna azimuth coordinates and elevation, there will no longer being any need to construct the reference spectrum and conduct spectrum correlation with the captured spectra.

Since the late 1990's, many broadcasters have been transmitting their own identification data string making the RF signature 100% unique with zero chance of miscorrelation.

In the US, the transmission of extra broadcasting material via the 19 kHz subcarrier has been known as SCA (Subsidiary Communications Authorization). The diagram in FIG. 3 shows the assignment of frequencies used in an FM transmitter. The main channel is the program heard with a monaural FM radio. These frequencies extend from below 25 Hz to 15 kHz. At 19 kHz, is the stereo pilot. The pilot is used to extract the stereo programming, which exists from 23 to 53 kHz. At 57 kHz is the RDS subcarrier used for data to carry such information as the station's callsign, and the name of the selection currently playing. From 60 to 74 kHz is the 67 kHz subcarrier and from 85 to 99 kHz is the 92 kHz subcarrier.

The technical nomenclature for SCA (Subsidiary Communications Authorization) transmissions is; FM subcarrier on FM carrier, frequency division multiplexing. In Europe the general concept has been referred to for several years as RDS (Radio Data System). It allows transmission of a station ID, program info, local travel info including traffic reports and other information. It will continuously probably evolved into much more. As digital broadcasting takes over in the future, even more uses will be found.

Previously known techniques based on GPS tracking or cellular phone tracking demand expensive and large size receiver that operate for only a few days when powered by battery. By employing coarse tracing, embodiments of this invention provide global tracing with resolution equivalent to sub-cities. For a tag comprising a micro FM receiver, the manufacturing cost can be less than $3.50 USD each, while its dimensions may be smaller than a dime and battery operation time may exceed 1 year.

This system provides a worldwide coarse traceability passive, miniature and low-powered apparatus and method at a significantly lower cost than the active system described in the prior art.

It has been proposed for public broadcasters to incorporate in their signals not only the station identifier but also the current time. In that event, receivers embodying the present invention need not generate the time stamp for the frequency spectra but rather will extract the current time from one of the received signals. Moreover, it is envisaged that the broadcaster could also transmit the station's geographical coordinates, e.g., as ordnance survey map coordinates, in which case the receivers embodying the present invention could capture that information in addition to, or eventually instead of, the frequency spectra.

Although an embodiment of the invention has been described and illustrated in detail, it is to be clearly understood that the same is by way of illustration and example only and not to be taken by way of the limitation, the spirit and scope of the present invention being limited only by the appended claims.

The invention claimed is:

1. A tracing system for providing a trace of a geographical path of travel previously taken by an entity or object, the system comprising: a tag device and a data retrieval unit:

the tag device being associated, in use, with the entity or object and comprising a radio receiver programmed to scan a predetermined radio band at different times as the entity or object traverses said path of travel, and to capture at a current location of the entity or object at each said time a frequency signature associated with said current location, said frequency signature representing the extant frequency spectrum expressed as signal strength versus frequency within said predetermined frequency band; storage unit configured to store the frequency signature associated with each said current location for later retrieval; and an output for outputting a resulting plurality of frequency signatures stored in said storage unit, the retrieval unit comprising a computer programmed to communicate with said output of the tag device, to retrieve a plurality of frequency signatures stored in said storage unit, to compare said frequency signatures with known antenna transmission data and geographical location data to determine the location of the tag device at the time when each stored frequency signature was captured, to derive the path of travel from the successive geographical locations, and to provide a trace of said path of travel.

2. A tracing system according to claim 1, wherein the computer is operable following retrieval of the captured frequency signatures to (i) receive user-supplied information identifying at least approximately a first search area traversed by the tag device, to retrieve antenna transmission and geographical location data to construct a first frequency signature comprising a set of signal frequencies and strengths of signals receivable in said search area at the time the tag was in said first search area;

(ii) correlate the first constructed frequency signature with each frequency signature in turn to determine the captured frequency signature having the highest correlation therewith and store geographical coordinates of the first search area as the geographical location of the tag device when said highest-correlation frequency signature was captured;

(iii) define a second search area encompassing an area around or neighboring the first search area;

(iv) construct a second constructed frequency signature for the second search area comprising a set of signal frequencies and signal strengths of signals receivable in said second search area at the time the tag device was in said second search area, (v) correlate the second constructed frequency signature with at least those captured frequency signatures captured at times close to the time of capture of the first captured frequency signature to determine a second captured frequency signature having the highest correlation therewith;

(vi) store geographical coordinates of the second search area as the geographical location of the tag device when said second highest-correlation frequency signature was captured;

and repeat the process for other captured frequency signatures to obtain geographical coordinates of successive regions traversed by the tag device.

3. A system according to claim 2, wherein the computer is operable, prior to correlating a particular captured frequency signature with a constructed signature, to compare signal strengths of signals in said captured signature with a predetermined threshold signal strength level and select only those signals whose strengths exceed the predetermined threshold signal strength level for correlation with the constructed signature.

4. A system according to claim 1, wherein the computer is operable to derive from the geographical coordinates of the series of regions a map of regions with the path depicted as an overlay thereupon.

5. A system according to claim 1, wherein the receiver demodulates from each transmission signal information identifying the geographical location of broadcast transmitter antenna, and stores said information in the corresponding record for the time at which the transmission signal information was received, the identification information being used, when the tag device has traversed the path, to determine the coarse geographical location of the tag device at the times at which the transmission signal information was received.

6. A system according to claim 1, further comprising a database comprising historical collections of said reference signatures allowing comparisons with reference signatures that were valid or pertaining at the times and geographical locations at which the radio receiver of the tag device scanned and stored the frequency signatures.

7. A system according to claim 1, wherein the predetermined radio frequency band is selected according to the path being or to be traversed.

8. A system according to claim 1, wherein the predetermined radio band is a broadcast radio band(s) used in geographical areas to be traversed by the entity or object.

9. A system according to claim 1, wherein the different times are preset and are selected according to the path being or to be traversed and the resolution required for the mission of the tag.

10. A system according to claim 1, wherein the known antenna transmissions and geographical location data are stored on a network element of a public data network and accessed from a computer used to retrieve said captured frequency signatures.

11. A system according to claim 1, wherein said predetermined radio frequency band is selected from the group consisting of the FM broadcast frequency band of about 88 to about 108 MHz, the FM broadcast band of about 86 MHz to about 108 MHz, broadcast television bands and cellular telephony bands.

12. A system according to claim 1, wherein the known antenna transmissions and geographical location data are stored on a network element and accessed via the Internet from a computer used to retrieve said capture frequency spectra.

13. A system according to claim 1, wherein said trace is provided in a form for display on a display device.

14. A system according to claim 1, wherein said trace is provided in a computer-readable form.

15. A method of providing a trace of a geographical path previously taken by an entity or object comprising the steps of: associating with the entity or object having associated therewith a tag device having a radio receiver for capturing frequency spectra, a storage unit for storing captured spectra and output means for outputting a resulting plurality of captured frequency spectra, the method comprising the steps of:

scanning a predetermined radio frequency band with said radio receiver at each of a plurality of times as the entity or object traverses the path, and capturing at a current location of the entity or object at each of said times a frequency signature associated with said current location, said frequency signature representing the frequency spectrum extant expressed as signal strength versus frequency within said predetermined frequency band at each time, and storing a plurality of said captured frequency signatures in said storage unit for later retrieval;

and when the tag device and entity/object have traversed the path, retrieving said plurality of captured frequency signatures from the tag device and correlating said captured frequency signatures with known antenna data and geographical location data to determine the location of the tag when each captured frequency signature was captured, deriving the path from the successive locations, and providing a trace of said travel path.

16. A method according to claim 15, wherein the step of retrieving and correlating the captured frequency signatures comprises the steps of (i) using user-supplied information identifying at least approximately a first search area traversed by the tag device, retrieving antenna transmission and geographical location data to construct a first frequency signature comprising a set of signal frequencies of signals and signal strengths receivable in said search area at the time the tag was in said first search area;

(ii) correlating the first constructed frequency spectrum with each captured frequency signature in turn to determine the captured frequency signature having the highest correlation therewith and storing geographical coordinates of the first search area as the geographical location of the tag when said highest-correlation frequency signature was captured;

(iii) defining a second search area encompassing an area around or neighboring the first search area;

(iv) constructing a second constructed frequency signature for the second search area comprising a set of signal frequencies and strengths of signals receivable in said second search area at the time the tag device was in said second search area;

(v) correlating the second constructed frequency signature with at least those captured frequency signatures captured at times close to the time of capture of the first captured frequency signature to determine a second captured frequency signature having the highest correlation therewith;

(vi) storing geographical coordinates of the second search area as the geographical location of the tag device when said second highest-correlation frequency signature was captured;

and repeating steps (iii) to (vi) for other captured frequency signatures to obtain geographical coordinates of successive regions traversed by the tag device.

17. A method according to claim 16, comprising the step, prior to correlating a particular captured signature with a constructed spectrum, of comparing signal strengths of signals in said captured signature with a predetermined threshold signal strength level and selecting only those signals whose strengths exceed the predetermined threshold signal strength level for correlation with the constructed signature.

18. A method according to claim 15, wherein the correlation step includes the step of deriving from the geographical location coordinates for the series of regions a map of regions with the path depicted as an overlay thereupon.

19. A method according to claim 15, wherein the receiver demodulates from each transmission signal information identifying the source, and stores said information in the corresponding record for that time, the identification information being used, when the tag device has traversed the path, to determine the geographical locations of the receiver at the times at which the frequency signatures were captured and hence the path traversed by the tag device and entity or object with which it travelled.

20. A method according to claim 15, wherein the correlation step uses a database comprising historical collections of said reference signatures allowing comparisons with reference signatures that were valid or pertaining at the times and geographical locations at which the tag device scanned and stored the frequency signatures.

21. A method according to claim 15, wherein the predetermined radio frequency band is pre-selected according to path being or to be traversed.

22. A method according to claim 15, wherein the predetermined radio band is a broadcast radio band(s) used in geographical areas to be traversed by the entity or object.

23. A method according to claim 15, wherein said times are preset and selected according to the path being or to be traversed and the resolution required.

24. A method according to claim 15, wherein the predetermined radio frequency band is selected from the group consisting of the FM broadcast frequency band of about 88 to about 108 MHz, the FM broadcast band of about 86 MHz to about 108 MHz, broadcast television bands and cellular telephony bands.

25. A system according to claim 15, wherein said trace is displayed on a display device.

26. A system according to claim 15, wherein said trace is provided in computer-readable form.

27. A radio receiver tag device suitable for use in providing a trace of a path taken by an entity or object while accompanied by the radio receiver tag device, comprising:

a radio receiver operable to scan a predetermined radio frequency band and capture data representing a frequency signature thereof, said frequency signature representing the extant frequency spectrum expressed as signal strength versus frequency within said predetermined frequency band;

a storage unit configured to store a plurality of data records each corresponding to a respective one of a plurality of the frequency signatures;

a controller for controlling the radio receiver to scan the radio frequency band at selected times, while the entity or object is traversing said path, and store the resulting plurality of frequency signatures in said storage unit for later retrieval; and an output device for outputting said plurality of frequency signatures.

* * * * *